April 14, 1964   V. K. CHARVAT   3,129,269
METHOD OF MAKING A BRUSH TYPE ROTARY TOOL
Filed Aug. 17, 1959   2 Sheets-Sheet 1
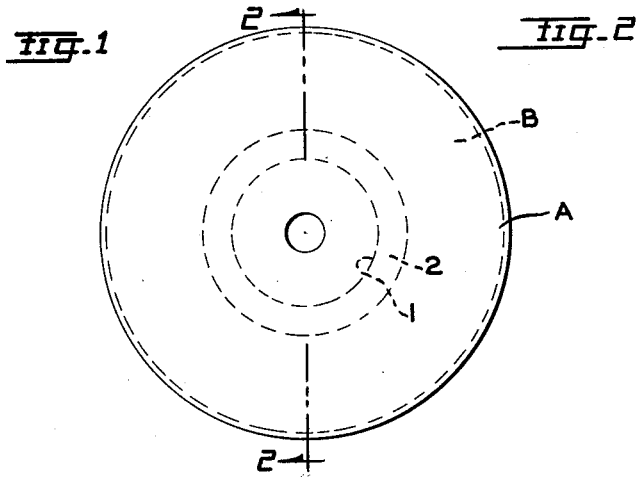
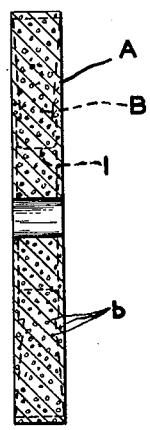
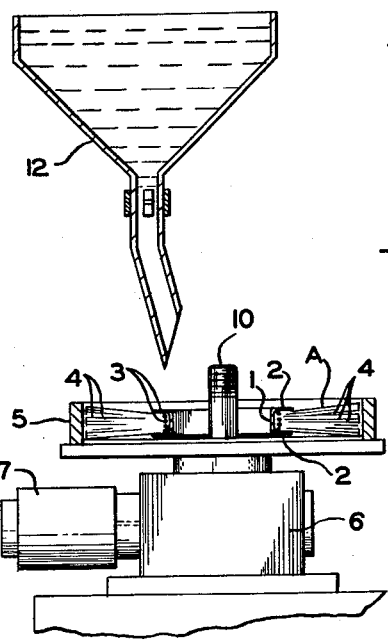
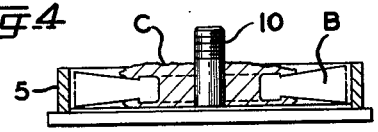
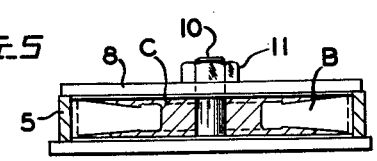
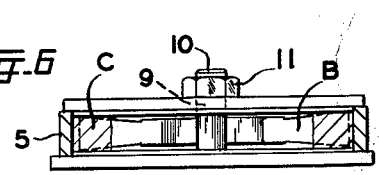
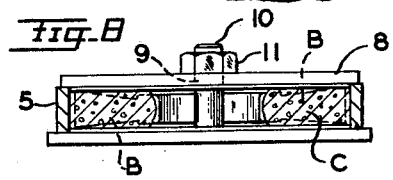
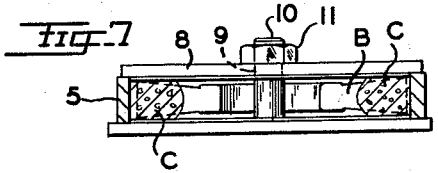
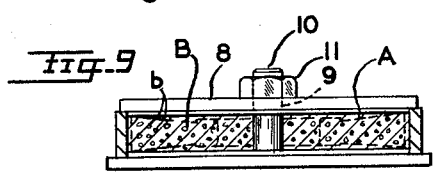
INVENTOR.
VERNON K. CHARVAT
BY
Oberlin, Maky & Donnelly
ATTORNEYS

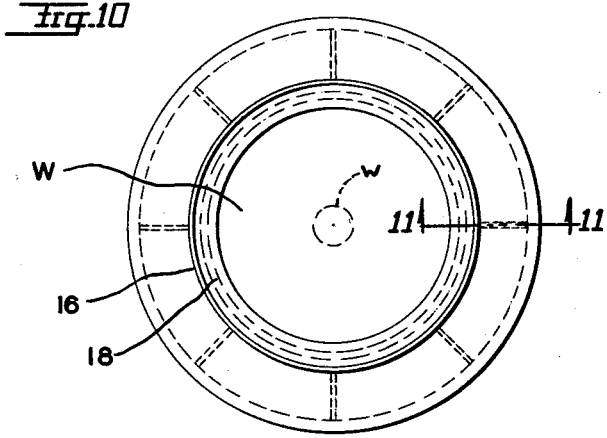
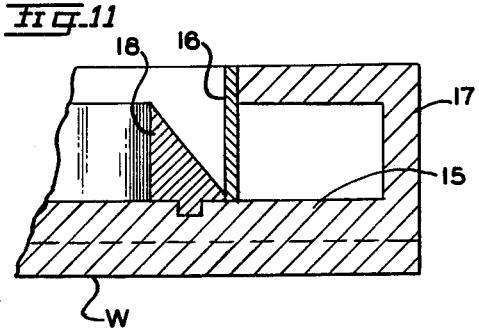
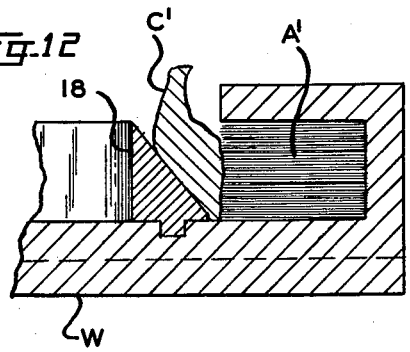
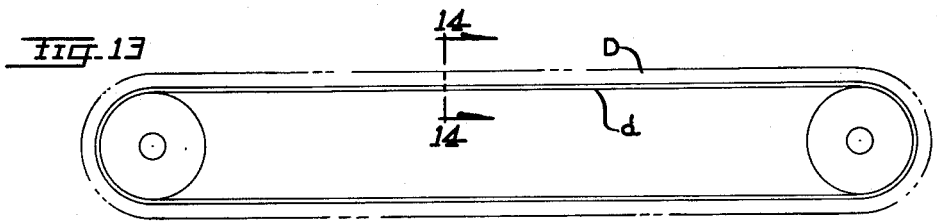

United States Patent Office 3,129,269
Patented Apr. 14, 1964

3,129,269
METHOD OF MAKING A BRUSH TYPE
ROTARY TOOL
Vernon K. Charvat, Bay Village, Ohio, assignor to The Osborn Manufacturing Company, Cleveland, Ohio, a corporation of Ohio
Filed Aug. 17, 1959, Ser. No. 834,091
11 Claims. (Cl. 264—45)

While the present improvements are identified as relating to a brush type rotary tool and the principal field of use envisaged for the product is as a polishing or abrading tool, such product may find utility for other uses, for example, as a supporting or traction wheel for vehicles, using the latter term in its most general sense.

As shown, for example, in Peterson Patent No. 2,826,776, it has heretofore been proposed to make brushing tools of various types by combining with brush bristle material a body of resilient plastic or elastomeric material, and a number of such materials have been proposed, including natural rubber and various kinds of artificial rubber, as well as other synthetic resins, such as polymerized chloroprene, which, by incorporation of a suitable gas forming ingredient, will impart a cellular structure to the body. However, in all cases there has remained the problem of introducing the selected elastomeric material into and among the brush bristles so as to uniformly coat the latter and fill the space therebetween. Particularly where the brush bristles are of filamentous form or lack sufficient stiffness so that they become easily disarranged or tangled, the problem of incorporating such a body of elastomeric material has, so far as I am aware, never heretofore been satisfactorily resolved.

One of the principal objects of the present invention is to provide a method of making brush and brush-like products wherein centrifugal force is utilized to distribute the material that constitutes the elastomeric body of the finished product into and among an assemblage of bristles. At the same time and by the same means, the latter may be effectively maintained in desired position and spread apart relation to each other.

As a result, a product is obtained that has a variety of unique characteristics, whereby it constitutes a superior material not only for rotary tools but for other types of polishing and abrading tools, as well as in fields of use unrelated to polishing and abrading.

Other objects will appear as the description proceeds.

To the accomplishment of the foregoing and related ends, said invention then consists of the method and resulting product hereinafter fully described and particularly pointed out in the claims, the annexed drawings and the following description setting forth in detail certain steps and products exemplifying my invention, such disclosed procedures and products constituting, however, but one of the various applications of the principle of my invention.

In said annexed drawings:

FIG. 1 is a semi-diagrammatic axial view of a brush type rotary tool or wheel made in accordance with my invention;

FIG. 2 is a diametral transverse section of such tool or wheel, as indicated by the line 2—2, FIG. 1;

FIG. 3 is a diagrammatic elevation, partly in cross-section, of a circular mold mounted upon a turntable or centrifuge adapted for the production of a rotary tool or wheel, as illustrated in FIGS. 1 and 2, the brush component of such wheel being shown properly placed in the mold;

FIGS. 4 to 9, inclusive, are views similar to that of FIG. 3 showing such circular mold apart from its mounting and illustrating successive operative stages in the production of the aforesaid rotary brush or wheel;

FIG. 10 is a plan view of a modified construction of mold suitable for the production of an annular tool or wheel of relatively large diameter, which may be used in the form of an endless belt or otherwise;

FIG. 11 is a transverse section, on a larger scale, of such modified mold proper, the plane of the section being indicated by the line 11—11 on FIG. 10;

FIG. 12 is a sectional view similar to that of FIG. 11, but illustrating an intermediate operating stage;

FIG. 13 illustrates diagrammatically the product of such modified mold adapted for use as an endless polishing belt; and FIG. 14 similarly illustrates the use of such product to form a flat polishing brush.

The brush type rotary tool or wheel illustrated in FIGS. 1 and 2 constitutes only one of the several products which may be made by my improved method. As thus illustrated, such tool or wheel comprises what, for lack of a better term, will be called an annular brush body A incorporated in an annular body B of a selected elastomeric material, preferably, but not necessarily, a resilient deformable cellular composition.

As shown more in detail in the succeeding FIGS. 4 to 9 inclusive, the brush body A, thus selected for illustrative purposes, comprises an annular base ring 1 with outwardly directed flanges 2, between which are seated one or more bristle assemblies, four being shown, each such bristle assembly in turn comprising a retaining ring 3, of wire or equivalent material, about which the bristles 4 are looped so as to extend radially therefrom in more or less uniformly spaced condition. The bristles 4 may be made of a variety of materials, depending on the particular use to which the finished tool or wheel is to be put. Thus, such bristles may consist of steel or other metallic wire, straight or crimped and of a selected gauge and temper, or such bristles may consist of non-metallic materials, such a tampico or comparable synthetic fibers, as well as of soft, highly flexible material such as cord which, as previously indicated, is particularly difficult to incorporate in a body of elastomeric material such as here proposed.

The brush body A, or rather the separate bristle assemblies comprised therein, may, of course, be constructed in various ways other than that selected for the purpose of illustration. For example, the annular flanged base 1 may be omitted, leaving such body to consist simply of one or more retaining rings 3 with the brush material 4 carried thereby. Indeed, such ring may be omitted and the inner ends of the bristles secured in relatively fixed position by applying a suitable adhesive thereto, or by interfusing such ends.

As previously explained, the brush body illustrated in FIGS. 1 to 9 inclusive is merely typical of brush bodies formed of annular bristle assemblies, however, they may be made up; i.e., whether of looped brush material as thus shown or of twisted tufts as shown in Peterson Patent No. 2,866,989, and whether or not the assemblies be mounted on an annular base such as the flanged base ring 1. For example, such bristle assemblies, or sections, may be made in any one of the several ways illustrated in First Patents Nos. 1,391,051 and 1,394,993 or in Peterson Patent No. 2,303,386. Actually, the latter illustrates a brush strip of indefinite length wherein the bristle are retained in a channel by means of a wire about which the bristles are bent or looped. Obviously, my present improved method may be employed using brush material of the form just described by merely bending a suitable length of the channel or base that carries the bristles into the form of a circle, i.e., an annulus, or by bending a longer piece of such brush strip into the form of a helix with any desired number of turns. In this manner a brush cylinder may be formed having a face of any desired width; or such a brush may, of course, be made by assembling a suitable number of units of relatively small face width assembled side by side on a hub or arbor.

A variety of compositions may be employed to form the body B of elastomeric material, provided that at the initial stage of the operation, presently to be described, such composition is in liquid state but capable of being hardened, or rather solidified, by subsequent treatment as by the application of heat. Also, as previously indicated, such composition may and will ordinarily desirably include an ingredient capable, at a suitable stage in the operation of making the rotary tool or wheel, to produce a multitude of small bubbles or cells $b$ in the body, whereby the latter is rendered resiliently deformable to desired degree.

While the hereinafter described polyurethanes are ordinarily preferred for my purpose, certain other plastic compositions or resins may be utilized in achieving some of the benefits of my invention; for example, phenolic, epoxy, natural rubber, polyisoprene, butadiene-styrene, butadiene-acrylonitrile, and polyvinyl chloride resins, especially foams. Abrading wheels of epoxy resin foam and abrasive, and wheels of vinyl plasticol and abrasive are especially useful for some purposes.

Among presently available compositions, I prefer to employ as the elastomeric material to form the body B one of the isocyanate resins, known as polyurethanes, which are formed by the reaction of a diisocyanate (usually toluene diisocyanate) with a polyester and/or polyether, the result of the reaction being the formation of a long chain of polyurethane. The addition of water (and/or acid) to the reaction mixture causes cross-linking of the polyurethane chains, releasing carbon dioxide which serves as a foaming agent.

The reagents, and in particular the polyester, employed in making the foamed polyurethane elastomeric body will vary depending upon the degree of resiliency or rigidity and other characteristics which it is desired such body should possess. For the polyester, one of the series currently marketed by American Latax Products Corporation of Hawthorne, California, under the trade name "Stafoam" has been found satisfactory. One of the 300 Series products under this trade name, more specifically one of such series containing at least one or more benzene rings, will produce a relatively rigid body. The following is another formulation using a resin sold by Nopco Chemical Company under the trade name "Lockfoam" which will produce a resilient wheel:

| | Grams |
|---|---|
| A-516-R "Lockfoam" resin manufactured by The Nopco Chemical Company | 189 |
| A-516-C foaming agent also manufactured by The Nopco Chemical Company | 11 |

Another formulation including a polyester selected according to the degree of resilience desired is as follows:

| | Parts by weight |
|---|---|
| Polyester | 100.0 |
| Toluene diisocyanate | 35.0 |
| Water | 2.4 |
| N-methyl morpholine | 1.3 |
| Glycerol monoricinoleate | 1.0 |

The manner in which a composition, such as has just been described, is applied to a brush body of the type illustrated in FIGS. 1 and 2 will be found illustrated in FIGS. 4 to 9, inclusive. As there shown, the previously assembled brush body A is placed in an annular mold 5, the base of which is secured to a turntable rotatable about its vertical axis by a worm gear unit 6 driven by an electric motor 7 or some other source of power. The mold 5 is provided with a removable cover plate 8 having a central opening 9 adapted to fit over an axial threaded stud 10, so that by means of a nut 11 such cover plate may be clamped firmly to the mold.

After the brush body A has been placed in the uncovered mold, as illustrated in FIG. 1, a measured quantity C of the selected elastomeric material in liquid form is discharged therein, as from a hopper-like container 12. Such discharge will be into the opening left between the brush body A and the stud 10. Where the selected material is a foaming polyurethane, the reacting components of the latter may be either premixed before being introduced into the mold, or a suitable amount of each may be separately introduced in the manner and by the means just described. In any event, the amount of such composition will be substantially less than sufficient to fill the central cavity left in the mold and the space on either side of the brush body when the cover plate is applied as illustrated in FIG. 4.

Immediately following the cover plate is applied and secured in place, the turntable with the mold secured thereto is rapidly rotated so as to subject to centrifugal action the body of elastomeric material thus introduced, the effect of such rotation being to drive such material into the outer annular portion of the mold which is, of course, partially occupied by the corresponding outer ends of the bristles 4. One important effect of the centrifugal force generated by the rotation of the mold is to maintain the brush bristles in proper radially projecting position, even where such bristles are composed of fine flexible wires or of soft flexible cord material. Also, incidentally, the elastomeric material in the course of its radial displacement will coat the individual bristles and thus assure a more thorough bonding of the latter in the next operative step.

Where the volume of the elastomeric material is not going to be further expanded by the generation of gas bubbles therein, the amount introduced before closing the mold may and desirably will be sufficient to incorporate in the annulus formed thereof by rotation of the mold the entire body of bristle material down to the base thereof and when this stage is reached, the material may then be set or hardened in such manner as required, e.g., by the application of suitable heat where the material is a vulcanizable natural or synthetic rubber.

In the operation illustrated in FIGS. 4 to 9, inclusive, it is assumed that a foaming polyurethane, as hereinbefore described, is employed and, in that event, the material following brief centrifuging action (45 seconds at 3,000 r.p.m.) will be in the form of a liquid annulus approximately as shown in FIG. 6. However, due to the foaming characteristic of the reacting components, such body will perforce expand inwardly, being confined between the lateral and outer circular walls of the mold so that, under the conditions just stated, the annulus after one minute will assume the position shown in FIG. 7, after two minutes later that shown in FIG. 8, and after four minutes later that shown in FIG. 9, at which last stage of expansion all of the empty space within the mold, including that between the radial extending bristles 4 of the brush body A, will be completely filled by the resulting resiliently deformable cellular composition.

Upon termination of the centrifuging, the molded article may be removed from the mold and maintained at a selected temperature and for such a period of time as will impart to the body of the elastomeric material the desired degree of rigidity having regard to the characteristics of such material. Where as in the above example a foaming polyurethane is utilized to form the elastomeric body, it will suffice to maintain the molded article at approximately 150° F. for a period of 30 minutes, whereupon it is ready for use, but by being left in the mold for about two hours and being heated during this period to approximately 200° F., a more rigid product will result.

As illustrated in FIG. 9, the expanded elastomeric material completely fills not only the space left in the annular portion of the mold lying beyond the base of the brush body, but also the space within the latter, except of course for that occupied by the stud 10. However, by using a lesser amount of elastomeric material, the latter in its expanded form may be caused to terminate at the brush base and, if found desirable, means such as a ring (not illustrated) completely sealing all the mold space lying within the brush base, may be interposed at any time after the operative stage illustrated in FIG. 6 and before the body of elastomeric material has fully expanded.

Alternatively, where it is desired to limit the inward extent of the resulting rotary tool or wheel at the base of the brush body by inserting a sealing ring, as just described, such ring may be inserted when the mold is first assembled, i.e., at the same time the brush body is placed therein, and the composition used to form the elastomeric body, instead of being introduced centrally in the mold, as illustrated in FIG. 4, may be introduced at a point or points radially beyond such sealing ring prior to closing the mold and setting it in rotation. In such case, in order to secure at once a uniform distribution of the material in question, the mold and source of supply may be relatively moved rotatably about the axis of the mold.

Where the body of elastomeric material is allowed, through expansion or otherwise, to extend inwardly beyond the base of the brush body, such extending portion may be removed so that the finished rotary tool or wheel may be fitted directly onto a shaft of larger diameter than that of the stud 10, or by use of a suitable adapter it will be unnecessary to remove the central portion of the elastomeric body.

It will also be obvious that by suitably shaping the inner faces of the bottom and top or cover plate 8 of the mold 5, in other words by more or less closely laterally confining the brush body, the amount of elastomeric material along the sides of the brush may be controlled so that the finished product will approximate the form of that of the brush body in its initial state. So too the annular space shown in the several figures of the drawing between the outer face of the brush member and the inner face of the circular mold wall may be reduced so that the ends of the bristles composing the brush body will extend to the face of the finished rotary tool or wheel. However, this is not a matter of great importance since by raking, or other suitable treatment of the periphery, the bristle material may be cleared of surrounding elastomeric material so as to extend any desired distance beyond the periphery of the elastomeric body.

For many uses of my improved rotary brush a marked advantage is obtained by supporting the bristles, irrespective of their composition, in a body of resiliently deformable cellular composition, such as hereinbefore described, particularly where such body consists of a foamed polyurethane. While the bristles throughout the brush body are at all times maintained in proper true radial position and spaced apart relationship, the projecting ends of the bristles are capable of displacement when brought in contact with a surface to be worked, but such displacement is resiliently limited an a dampening action is exerted on such bristles throughout their entire length by their being thus encased in an elastomeric body of the character described.

Where it is desired to obtain an abrading as well as brushing action in the case of a rotary tool made as hereinbefore described, this result is readily achieved by intermixing with the elastomeric material, preferably prior to its introduction into the mold, of a siutable granular abrasive. The type, size and hardness of the abrasive selected will depend upon the particular result it is desired to obtain by use thereof in the rotary tool. Thus, any suitable abrasive material may be utilized such as silicon carbide, aluminum oxide, emery, garnet, talc, pumice, and lime silicon dioxide, depending upon the abrading action and resultant surface finish desired. While grit sizes of from 600 to 10 mesh may be utilized, the ordinary range will be from about 320 to about 36 mesh and most frequently from 60 to 24 mesh.

The urethane polymers have been found to provide a high degree of adhesion to abrasive grains and the like, permitting dense concentration of such abrasive grains in the working portion of the abrading tool, the amount of polyurethane in the interstices between such grains and serving to bond the same together being further reduced by inherent foaming reaction or by inclusion of a blowing compound which produces a multiude of small pores or cells within such interstices.

Other useful abrasive tools, such as wheels, have been produced wherein reinforcing fibers are incorporated with the reaction components, such as glass fiber, nylon monofilaments, sisal, tampico fiber, steel wire, cotton, and the like. Such materials have been found to enhance the wearing qualities of the abrading wheels.

My improved method is also adapted to the production of a brush or abrading tool in the form of an endless belt, as well as in the form of a flat brush or polishing tool. Where it is desired to make a product of this type, I employ an annular mold of the construction diagrammatically illustrated in FIGS. 10 and 11, where such mold in effect forms the rim of a ribbed, disk wheel W of relatively large diameter compared with the mold illustrated in the earlier described figures of the drawings, and rotatably mounted on a shaft w. It is deemed unnecessary further to describe the means for rotating such wheel, thus rotatably supported, preferably about a vertical axis, and the wheel may of course be spoked instead of in the form of a disc, as shown.

The annular mold is substantially identical with the one previously described, comprising an annular bottom plate 15, which, as shown, is actually a rim portion of wheel, but which may, if desired, be detachably secured to the wheel; a detachable inner wall 16 and an integral outer wall 17 on such bottom plate adjacent its respective inner and outer edges, and an annular cover plate 18, shown as integral with and projecting inwardly from outer wall 16, but which may be detachable as in the case of the previously described mold.

In operating a mold of this construction, a brush body A′, as hereinbefore described, but of relatively large diameter, may be placed in the mold cavity formed by the bottom wall 15 and side walls 16 and 17. Such body may be conveniently made by using a brush strip of the type illustrated in the above-cited Peterson Patent No. 2,303,386 by bending an appropriate length of such strip into circular form, or into a helix composed of several such turns. However, for used with this type of mold, such brush body can consist, as shown, merely of an elongated assembly of bristles, or equivalent fibrous material, wherein the fibers are disposed transversely of the length of the body to form a layer having a thickness approximately equal to the vertical depth of the mold. The inner wall 16 of the mold 17 of the mold being removed, one end of a bristle assembly as just described may be inserted into the mold and by radial outward pressure such insertion continued through the entire circumference of the mold until it is completely filled.

The composition selected to form the elastomeric body, e.g., a foaming polyurethane, is then discharged into the annular trough-like mold preferably adjacent the inner wall thereof. This step may be facilitated by using a plurality of suitably located receptacles with controlled discharge on the order of containers 12, or by slowly rotating the mold beneath a single such receptacle, so that in either case the required amount of such material will be substantially uniformly distributed throughout the mold. Thereupon the inner wall 16 of the mold 17 of the mold is secured in place and the wheel W rapidly rotated to produce a centrifuging action similar to that obtained in the previously described mold of smaller diameter. For the purpose of securing inner wall 16 of the mold 17 in the place, a separate detachable ring 18 will be utilized, such ring having tongue and groove engagement with the body of wheel W and an outer sloping face. The object of the latter feature will be apparent from an inspection of FIG. 12 which shows the manner in which the material C' that forms the elastomeric body of the finished product is introduced into the mold. At this stage, the inner wall 16 of the mold will, of course, be removed. Accordingly, the outer sloping face of ring 18 will guide the flow of the material in question and assist in getting the required vertical distribution thereof across the base of the previously inserted brush body B'.

As explained in connection with the operation of such smaller mold, a selected granular abrasive may be intermixed with the elastomeric material and the latter will either include an ingredient capable of forming gas pockets, or in the case of polyurethane the latter will be of the foaming type, so that when set the resulting elastomeric body will have a resiliently deformable cellular composition. The setting of the body to selected state of rigidity will be accomplished in the same manner as before, whereupon the resulting product in the form in effect of a band having embedded in its outer or working face bristle material and, if desired, a granular abrasive, may be removed from the mold.

By proper selection of elastomeric material and treatment thereof, as aforesaid, this band may be left sufficiently flexible so that it may be employed in the form of an endless polishing belt D, such as diagrammatically illustrated in FIG. 13. For such use it may be desirable to attach the band D and support it by an ordinary belt d of leather, vulcanized rubber or the like which may be less stretchable than the band by itself. On the other hand, the band upon removal from the mold may be cut as on lines 14—14, FIG. 13, into sections D' of desired length which, if the original diameter of the article be large enough, although slightly arcuate, may be flattened out and secured to a suitable rigid back d', as illustrated, again diagrammatically, in FIG. 14.

Whatever the particular use for which the resulting product may be designed, or for which it may be found adapted, it will be obvious that by my unique method of incorporating bristle material, using this term in its widest sense, in a plastic body, and more particularly one consisting of a resiliently deformable cellular elastomeric composition such as the foamed polyurethane composition hereinbefore described, such bristles will in the first place be effectively bonded to such elastomeric body. Particularly, where the material that forms such body is subjected to centrifugal force in the rapidly rotating mold so as to form an annulus in the outer portion of the latter and is then expanded by the formation of bubbles therein so as more or less completely to fill the mold, the material as it flows radially outward will be first brought into contact with the individual bristles and then again brought into such contact during the expansion stage. Nevertheless, all the time the bristles will be maintained in desired radial and spaced apart position in the body of elastomeric material thus interposed.

In the final resiliently deformable cellular body, the bristles, while they are retained in such position, will be capable of limited bending action, but excessive bending will be restrained or dampened. Likewise, where a granular abrasive is introduced into the body, the grains will be embedded in the walls of the cellular structure and similarly resiliently held in spaced apart relation.

While the product, because of one anticipated field of use, has been termed a rotary tool, as hereinbefore noted the tool may take the form of an endless belt or even a flat pad. Furthermore, particularly where of circular or cylindrical form, the product may find use in entirely unrelated fields, e.g., as a wheel for supporting or propelling certain types of vehicles.

Other modes of applying the principle of the invention may be employed, change being made as regards the details described, provided the means, the steps of the method or the characteristics of the product stated in any of the following claims, or the equivalent of such, be employed.

I therefore particularly point out and distinctly claim as my invention:

1. In a method for making a brush-like product, the steps which comprise maintaining an assembly of bristles in desired spaced apart relation by the action of centrifugal force, introducing into such assembly a body of hardenable liquid binder subject to the same force, whereby such binder assumes the form of an annulus wherein said bristles are embedded, and then hardening said binder to desired degree.

2. In a method for making a brush-like product, the steps which comprise maintaining an assembly of bristles in desired spaced apart relation by the action of centrifugal force, introducing into such assembly a body of hardenable liquid binder subject to the same force, whereby such binder assumes the form of an annulus wherein said bristles are embedded, causing the formation of gas pockets in said binder, whereby such annulus is given a cellular structure, and then hardening said binder to desired degree.

3. In a method for making a brush type rotary tool wherein radially extending bristles are embedded in a plastic body, the steps which comprise rotating such bristles, assembled in annular form, about the center of such assembly at a speed sufficient to maintain such bristles in substantially radial position, introducing into such assembly, while being thus rotated, a body of hardenable liquid binder, and then hardening such binder to a desired degree.

4. In a method for making a brush type rotary tool wherein radially extending bristles are embedded in a plastic body, the steps which comprise rotating such bristles, assembled in annular form, about the center of such assembly at a speed sufficient to maintain such bristles in substantially radial position, introducing into such assembly, while being thus rotated, a body of hardenable liquid binder, causing the formation of a gas pockets in such binder, whereby said body is given a cellular structure and expanded and said bristles are separated to a substantial extent by such gas pockets, and then hardening such binder to desired degree.

5. In a method for making a brush type rotary tool wherein radially extending bristles are embedded in a plastic body, the steps which comprise rotating such bristles, assembled in annular form, about the center of such assembly at a speed sufficient to maintain such bristles in substantially radial position, introducing into such assembly, while being thus rotated, a body of polyurethane in liquid state and then causing such body of polyurethane to set to a selected state of rigidity.

6. In a method for making a brush type rotary tool wherein radially extending bristles are embedded in a plastic body, the steps which comprise rotating such bristles, assembled in annular form, about the center of such assembly at a speed sufficient to maintain such bristles in substantially radial position, introducing into such assembly, while being thus rotated, a body of foamable polyurethane in liquid state, causing such polyurethane to foam, whereby said body is expanded into a cellular structure and said bristles are separated to a substantial extent by the resulting gas pockets, and then causing such body of polyurethane to set to a selected state of rigidity.

7. In a method for making a brush type rotary tool wherein radially extending bristles are embedded in a plastic body, the steps which comprise rotating such bristles, assembled in annular form, about the center of such assembly at a speed sufficient to maintain such assembly in substantially radial position, introducing into such assembly, while being thus rotated, a body of hardenable liquid binder, and then hardening such binder to desired degree, the diameter of such annular bristle assembly and such binder being left sufficiently flexible to permit the bending of the finished product into substantially flat form.

8. In a method for making a brush type rotary tool wherein radially extending bristles are embedded in a plastic body, the steps which comprise rotating such bristles, assembled in annular form, about the center of such assembly at a speed sufficient to maintain such bristles in substantially radial position, introducing into such assembly, while being thus rotated, a body of hardenable liquid binder, and then hardening such binder to desired degree, the diameter of such annular bristle assembly and such binder being left sufficiently flexible to permit use of the finished product in the form of an endless belt.

9. In a method of incorporating in a body of elastomeric material an assembly of bristles arranged side by side, the steps which comprise flowing said elastomeric material, while in substantially liquid state, longitudinally of such bristles, to fill the space therebetween, thereupon causing the formation of a multitude of gas pockets in said elastomeric material with consequent expansion thereof in volume, controlling such expansion to produce reverse flow of said material longitudinally of such bristles, and then setting the latter into a resiliently deformable, cellular, solid state.

10. The method of forming a circular composite rotary tool which comprises placing a rotary abrading tool having radially outwardly extending elongated abrading elements within a circular mold, the inner circumferential surface of such mold being slightly spaced outwardly from the working ends of such elements, flowing elastomeric matrix material in a radially outward direction across at least one end face of such tool to a region adjacent such circumferential surface and causing such elastomeric material to foam to produce radially inward flow thereof between such elements, and then setting such elastomeric matrix material.

11. The method of claim 10, wherein such outward flow is accentuated through the action of centrifugal force.

References Cited in the file of this patent

UNITED STATES PATENTS

| | | |
|---|---|---|
| 2,190,206 | Churchill | Feb. 13, 1940 |
| 2,406,732 | Hardman | Aug. 27, 1946 |
| 2,604,362 | Sugarman et al. | July 22, 1952 |
| 2,634,167 | Bible | Apr. 7, 1953 |
| 2,648,084 | Swart | Aug. 11, 1953 |
| 2,826,776 | Peterson | Mar. 18, 1958 |
| 2,847,707 | Sullivan | Aug. 19, 1958 |
| 2,862,237 | Rekettye | Dec. 2, 1958 |
| 2,960,495 | Stingley | Aug. 30, 1960 |

FOREIGN PATENTS

| | | |
|---|---|---|
| 1,101,420 | France | Apr. 20, 1955 |
| 1,006,829 | Germany | Apr. 25, 1957 |